No. 825,478.  
PATENTED JULY 10, 1906.  
J. D. PARKE.  
FENDER FOR AUTOMOBILES.  
APPLICATION FILED MAY 3, 1906.
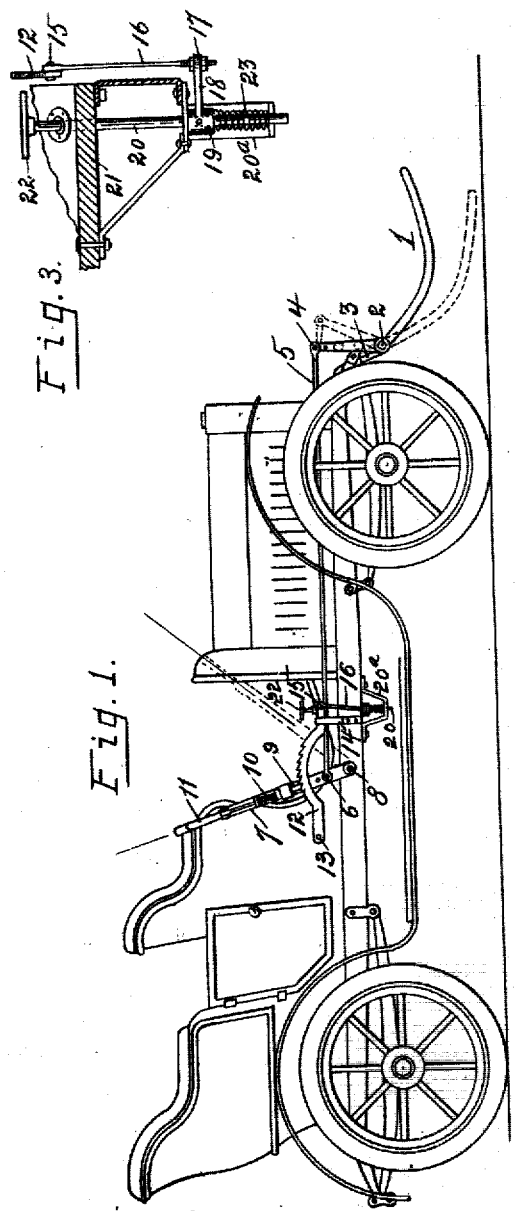
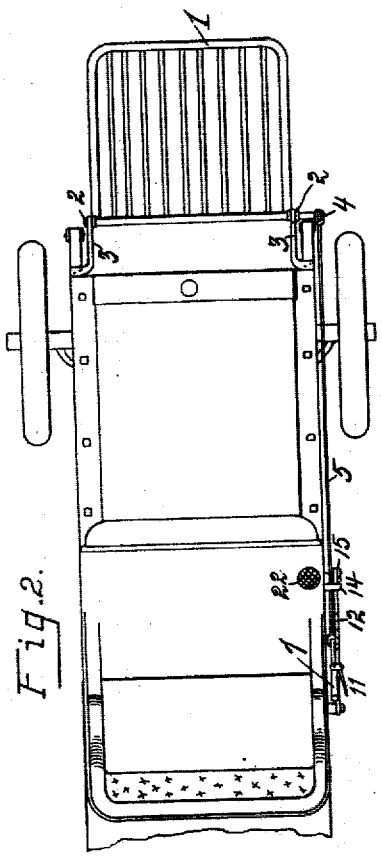
WITNESSES:  
D. C. Walter  
Ada Law
INVENTOR.  
James D. Parke  
T. Hinton Hall, Atty.

UNITED STATES PATENT OFFICE.

JAMES D. PARKE, OF TOLEDO, OHIO, ASSIGNOR OF ONE-HALF TO WILLIAM D. PARKE, OF TOLEDO, OHIO.

FENDER FOR AUTOMOBILES.

No. 825,478.   Specification of Letters Patent.   Patented July 10, 1906.

Application filed May 3, 1906. Serial No. 314,970.

*To all whom it may concern:*

Be it known that I, JAMES D. PARKE, a citizen of the United States, residing at Toledo, in the county of Lucas and State of Ohio, have invented certain new and useful Improvements in Fenders for Automobiles; and I do declare the following to be a full, clear, and exact description of the invention, such as will enable others skilled in the art to which it appertains to make and use the same, reference being had to the accompanying drawings, and to the figures of reference marked thereon, which form a part of this specification.

Many of the accidents due to the rapid running and to the momentum of automobiles may be avoided by the use of a fender on the front of the car.

The object of my invention is to provide such a fender which shall be light and strong, which shall be normally out of the way when not in use, and which may instantly by a slight touch of the foot of the operator be thrown into such operative position as to prevent foot-passengers or small animals from being run over. I attain these objects by means of the devices and arrangement of parts hereinafter described, and shown and illustrated in the accompanying drawings, in which—

Figure 1 is a side elevation of an automobile provided with my fender; Fig. 2, a top plan view of the same; and Fig. 3, a rear elevation, partly in section, of the tripping mechanism hereinafter referred to.

Like numerals of reference indicate like parts throughout the drawings.

In the drawings, 1 is a fender consisting of a frame composed, preferably, of light steel rods. These rods I prefer to cover with closely-fitting india-rubber tubing. The top of this frame is curved into trough-like form, as shown in Fig. 1, and is pivotally supported, as at 2, upon forwardly-projecting brackets 3, secured to the front of the car. To one side of the upper rear edge of the frame 1 is pivotally secured, as at 4, a rod 5, which extends back horizontally to the side of the seat of the operator, where it is pivotally secured, as at 6, to a lever 7, the lower end of which is fulcrumed, as at 8, upon the frame of the car. Upon the side of the lever 7 is a pawl which slides in suitable guides upon the lever and which is held normally depressed by a coiled spring 10. A grip-handle 11, pivotally connected with the pawl and arranged close to the handle at the top of the lever 7, serves to control the pawl 9.

12 is a rack-bar having teeth on its upper edge, which teeth are normally engaged by the pawl 9. This rack-bar is curved in approximately the arc of the circle described by the point of the pawl 9 and at its rear end is pivoted, as at 13, to the side of the car. The front end of the rack-bar moves in a suitable guide 14 and is pivotally connected, as at 15, with the upper end of a rod 16, which at its lower end is secured, as at 17, to an arm 18, secured by a sleeve, as at 19, to a short stout staff 20. This staff extends up through the floor 21 of the car and carries at its top a foot-plate 22 within convenient reach of the foot of the operator. The lower end of the staff 20 moves in a guide 20ª. A coiled spring 23, interposed between the bottom of the guide-piece 20ª and the part 19, serves to hold the staff and foot-piece 20·22 elevated.

The operation of my device is as follows: The parts being assembled and connected, as shown and described, the pawl 9 is held normally depressed by the spring 10, and the rack-bar 12 is pressed upwardly by spring 23 through the connections 18 and 16. The lever 7 being thrown back into the position indicated in Fig. 2 pulls upon a rod 5, thus throwing the fender up out of the way of obstructions, as shown by the solid lines in Fig. 1. Now should occasion require that the fender be quickly dropped close to the road the operator touches the foot-piece 22, thus depressing staff 20, arm 18, rod 16, and the forward end of the rack-bar 12. The pawl 9 is now disengaged from the teeth of the rack-bar, and the weight of the fender pulling on the rod 5 causes the lever 7 to swing forward, thus permitting the fender to drop into the position indicated by the dotted lines in Fig. 1. To restore the fender to its original position, it is only necessary to remove the foot from the foot-piece and to throw the lever back with its pawl into engagement with the rear tooth of the rack-bar. The fender may be raised or lowered or adjusted, as may be desired, by pressing the handle 11, thus disengaging the pawl from the rack, and by moving the lever into the desired position.

Having described my invention, what I claim, and desire to secure by Letters Patent, is—

1. In a device of the described character, a fender, a pivotal support for the fender upon which the fender may be swung vertically, a rod pivotally connected with the fender, a lever with which said rod is connected, a pawl upon the lever, a pivoted rack-bar having teeth adapted to engage said pawl, a foot-piece, connections between the rack-bar and the foot-piece, and a spring which holds the rack-bar normally in engagement with the pawl.

2. In a device of the described character, a fender, a pivotal support for the fender, a rod pivotally connected at one end to the fender, a lever pivotally connected with the other end of the rod, a pawl upon the lever, a spring which holds the pawl normally projected, a curved rack-bar having teeth normally engaged by said pawl, a foot-piece, connections between the foot-piece and the rack-bar, and a spring which holds the rack-bar pressed normally toward the pawl.

In testimony whereof I affix my signature in presence of two witnesses.

JAMES D. PARKE.

Witnesses:
  CLEM. V. WAGNER,
  ADA LAW.